United States Patent [19]
VanderMeer et al.

[11] Patent Number: 5,437,533
[45] Date of Patent: Aug. 1, 1995

[54] THRU-FLOW PALLETIZER/DEPALLETIZER

[75] Inventors: Richard H. VanderMeer; Donald J. Simkowski, both of Loveland, Colo.

[73] Assignee: Goldco Industries, Inc., Loveland, Colo.

[21] Appl. No.: 29,554

[22] Filed: Mar. 11, 1993

[51] Int. Cl.$^6$ .............................................. B65G 60/00
[52] U.S. Cl. ................... 414/789.5; 414/791.6; 414/796.2; 414/796.8
[58] Field of Search ............... 414/788.8, 791.6, 796.8, 414/933, 786, 791.7, 796.2; 198/347.1

[56] References Cited

U.S. PATENT DOCUMENTS

| | | | |
|---|---|---|---|
| 3,151,753 | 10/1964 | Verrinder et al. | 414/788.8 X |
| 3,180,499 | 4/1965 | Wildheim et al. | 414/796.8 |
| 3,200,969 | 8/1965 | Madden. | |
| 3,389,810 | 6/1968 | Wolfe et al. | |
| 3,788,497 | 1/1974 | Carlson | 414/788.8 |
| 3,865,258 | 2/1975 | Müller | 414/788.8 |
| 3,934,713 | 1/1976 | Van der Meer et al. | |
| 4,358,236 | 11/1982 | Dudley. | |
| 4,759,673 | 7/1988 | Pearce et al. | |
| 4,809,965 | 3/1989 | Vander Meer et al. | 271/11 |
| 4,834,605 | 5/1989 | Jerred | 414/791.7 |
| 4,934,508 | 6/1990 | Vander Meer et al. | 198/434 |
| 4,978,275 | 12/1990 | Reid et al. | |
| 5,253,743 | 10/1993 | Haas, Sr. et al. | 198/347.1 |
| 5,310,307 | 5/1994 | Vander Meer et al. | 414/796.8 X |

FOREIGN PATENT DOCUMENTS 2223782 11/1973 Germany .......................... 414/796.2

Primary Examiner—Michael S. Huppert
Assistant Examiner—Janice L. Krizek
Attorney, Agent, or Firm—Robert E. Harris

[57] ABSTRACT

Article diverting and storage system and method utilizing a thru-flow palletizer/depalletizer. Articles on an article conveyor are diverted from the article conveyor at a first location and moved along a first path toward a discharge end where a sweep unit of a palletizer/depalletizer urges and leads the diverted articles onto a pallet by groups for storage. When the stored articles are later needed, the articles are urged and led from the pallet by groups by the sweep unit and a retainer unit of the palletizer/depalletizer and moved along a second path separate from the first path to a second location of the article conveyor downstream from the first location where the articles are inserted onto the article conveyor. The system and method are particularly useful for storing cans diverted from a high speed can production and/or handling line, and for later supplying stored cans, when needed, to the line.

20 Claims, 2 Drawing Sheets

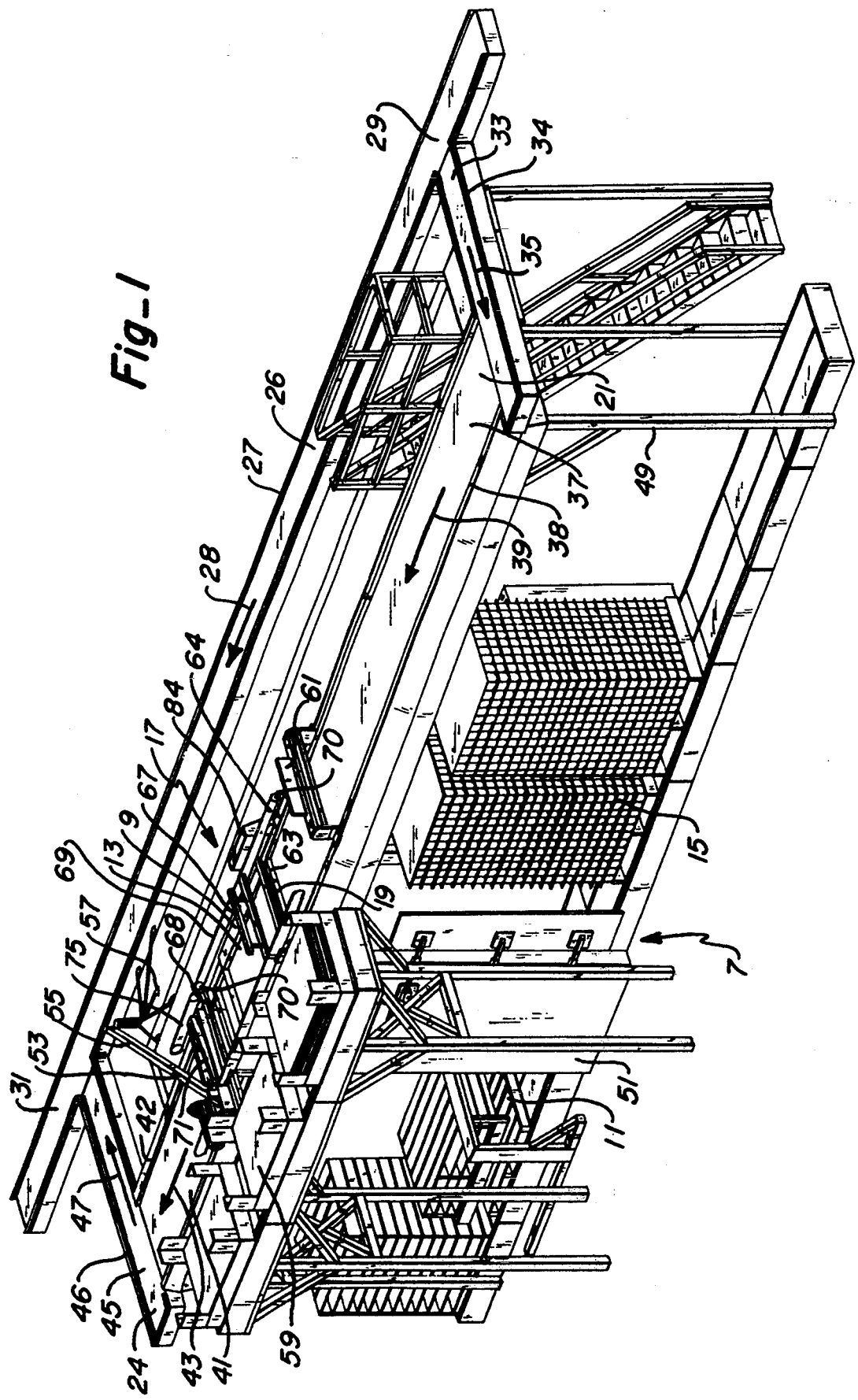

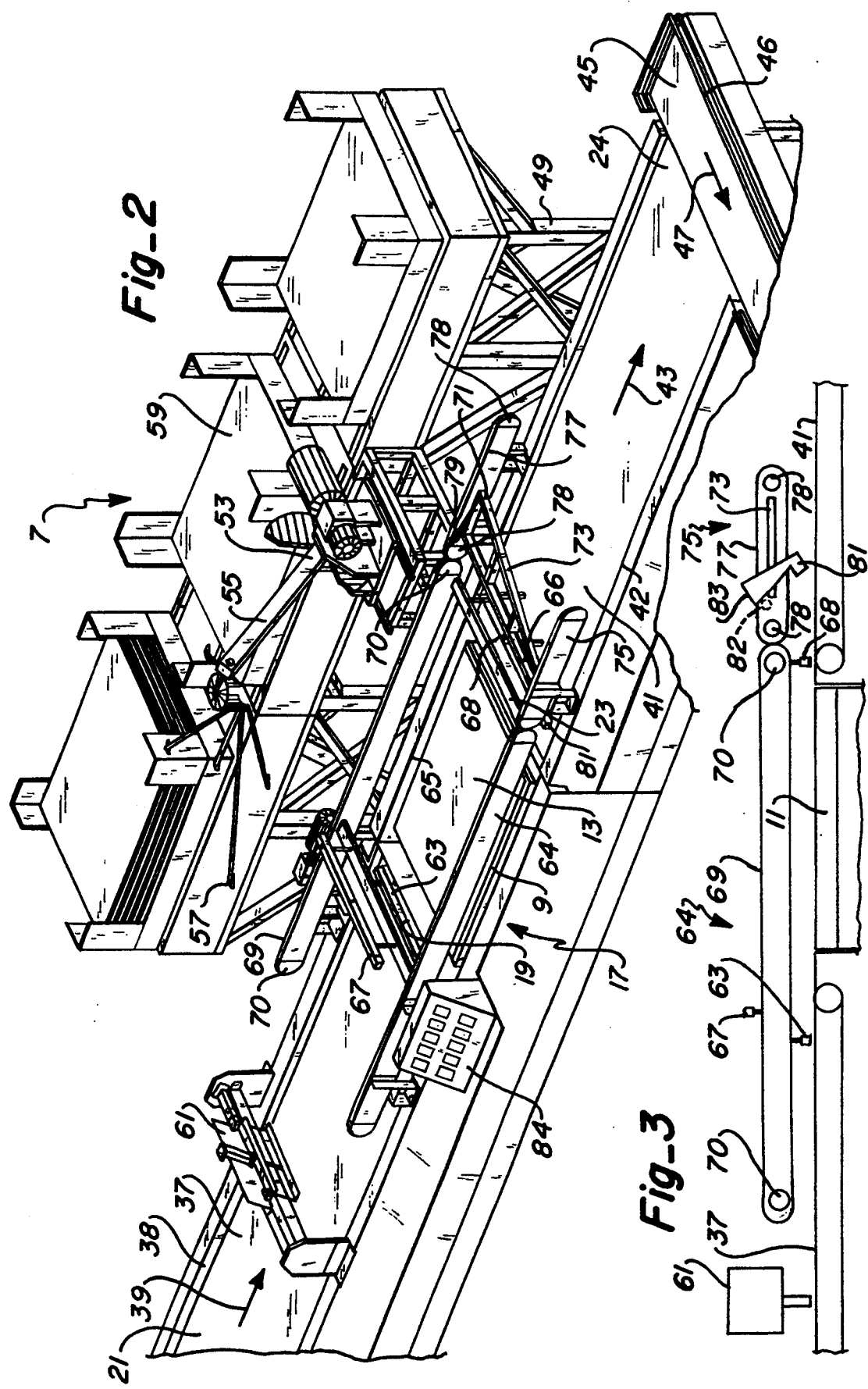

THRU-FLOW PALLETIZER/DEPALLETIZER

FIELD OF THE INVENTION

This invention relates to an article diverting and storage system and method, and, more particularly, relates to a thru-flow palletizer/depalletizer used in conjunction with an article conveyor.

BACKGROUND OF THE INVENTION

It is oftentimes necessary to convey articles, such as cans, between different locations and/or to store the articles between stages of operation. Palletizers are well known for use in storing articles, such as cans, and it is well known that groups of such articles can be stored on a pallet by layers, or tiers (see, for example, U.S. Pat. Nos. 4,759,673, 4,834,605 and 4,934,508).

It also is well known that tiers of articles can be urged onto a pallet using a sweep arrangement (see, for example, U.S. Pat. Nos. 3,934,713 and 4,978,275), and that a sheet transfer unit can be utilized to place sheets between each tier of articles on the pallet (see, for example, U.S. Pat. Nos. 4,759,673 and 4,809,965).

It is likewise well known that articles on a pallet can be urged from the pallet by a movable arm pushing the articles from the pallet (see, for example, U.S. Pat. No. 3,389,810).

It is also oftentimes necessary that articles, or containers, moving along a conveying line be diverted from the line during operation and accumulated or stored until later needed on the line. This has been found to be necessary, for example, in conjunction with lines conveying containers, such as cans, in order to accumulate and store the containers during the course of container line operations, such as, for example, container manufacture, labeling, and/or filling. Without such an accumulating or storing capability, the associated upstream and/or downstream production equipment would have to be frequently stopped, and then later restarted, due to jams, or the like, occurring on the line.

Accumulating tables have heretofore been utilized for accumulating and storing articles, such as cans, and such tables have heretofore been operationally connected with a production or handling line such that the articles either travel along the same path toward and away from the accumulating table or travel along one path to the table and along a different path from the table. Accumulating tables, however, have been found to require considerable floor space and/or have quite limited capacity.

With requirements for increased line speeds while maintaining product quality, it has become more important that frequent stops, or even slow-downs, of article production and/or handling equipment be minimized. Thus, it has become even more important to divert then unneeded articles and provide adequate storage for such diverted articles to thereby allow, for example, the upstream portion of a container line to continue operation while the downstream portion of the line is down, and vice versa.

Palletizer/depalletizer units have also heretofore been suggested for use in storing articles diverted from a production, or handling, line, and such units have not only provided greater storage for articles diverted from such a line, but have also provided a simpler mechanism for line speed balancing (pending the placement of the unit with respect to the line) by allowing accumulation, by palletizing, of all articles that the downstream portion of the production line could not then handle, and by depalletizing stored articles and supplying such articles to the downstream equipment as needed (as might occur, for example, if the upstream equipment was underproducing or not producing).

Palletizing/depalletizing units now known, however, divert articles, such as cans, from the production or handling line using a bi-directional arrangement (see, for example, U.S. Pat. No. 3,389,810) wherein the diverted articles are moved along a conveyor path in one direction from the production or handling line toward a storage pallet, and are moved in the opposite direction along the same conveyor path when the articles are urged back toward the production or handling line. Obviously, such an arrangement not only reinserts the articles at the same location as where diverted from the production or handling line, but also subjects the articles to a greater risk of damage, particularly where the direction of travel of the articles is frequently reversed.

While now known palletizer/depalletizer units attempt to provide a balance between speed of operation and product damage, as well as retaining a capability for reversing the direction of article movement in order to allow dual modes of operation (i.e., palletizing and depalletizing of the articles), the effectiveness of now known palletizer/depalletizer units could be improved.

SUMMARY OF THE INVENTION

This invention provides an improved article diverting and storage system and method using a thru-flow palletizer/depalletizer that allows increased speed of operation while minimizing product damage and also allows the required time for changes in mode of operation to be minimized.

It is therefore an object of this invention to provide an improved article diverting and storage system and method.

It is another object of this invention to provide an improved article diverting and storage system and method utilizing a thru-flow palletizer/depalletizer.

It is still another object of this invention to provide an improved article diverting and storage system and method for use in conjunction with an article conveyor.

It is still another object of this invention to provide an improved article diverting and storage system and method wherein articles diverted from a first location of an article conveyor are moved along a first path to a pallet for storage thereat, and are then later moved from the pallet along a second path different from the first path for insertion at a second location of the article conveyor downstream from the first location.

It is still another object of this invention to provide a thru-flow palletizer/depalletizer.

It is still another object of this invention to provide a thru-flow palletizer/depalletizer wherein articles diverted from a line are conveyed along an incoming path and urged and led by a sweep unit of a palletizer/depalletizer onto a pallet, and articles stored on the pallet are urged and led from the pallet by the sweep unit and a retainer unit of the palletizer/depalletizer onto an outgoing path different from the incoming path for insertion of the articles on the line at a location downstream from where articles are diverted from the line.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a perspective view of the article diverting and storage system of this invention shown in conjunction with an article conveyor;

FIG. 2 is a partial perspective view of the system shown in FIG. 1, but taken from the side opposite from that taken in FIG. 1; and FIG. 3 is a partial side view sketch of the system shown in FIGS. 1 and 2.

DESCRIPTION OF THE INVENTION

Article diverting and storage system 7 is formed as a thru-flow palletizer/depalletizer system that includes a storage unit 9 wherein pallets 11 are positioned at article loading/unloading area 13 to receive, store and then later discharge articles 15 (shown as cans in the drawings).

Palletizing/depalletizing unit 17 is positioned at article loading/unloading area 13 to urge articles onto a pallet then positioned at the loading/unloading area during palletizing operations and to urge the articles from the pallet during depalletizing operations.

During palletizing operations, palletizing/depalletizing unit 17 operates at one side 19 (as best shown in FIG. 1) of storage unit 9 to urge and lead articles from receiving, or incoming, article conveying unit 21 onto a pallet at the storage area, and, during depalletizing operations, palletizing/depalletizing unit 17 operates at the opposite side 23 (as best shown in FIG. 2) of storage unit 9 to urge articles from a pallet at the storage unit onto a discharge, or outgoing, article conveying unit 24.

As best shown in FIG. 1, system 7 is utilized in conjunction with an article conveyor 26, which conveyor is normally, for example, a part of a conveying system for moving articles, such as cans, during production and/or handling, with article conveyor 26 having sidewalls 27 and establishing a path along which the articles are moved in a predetermined direction (as indicated by arrow 28 in FIG. 1).

For purposes of this invention, articles to be removed from article conveyor 26 are diverted from the conveyor at upstream location 29 (as illustrated in FIG. 1) and the diverted articles are received by incoming article conveying unit 21. Articles to be inserted onto article conveyor 26 are inserted at downstream location 31 (as illustrated in FIG. 1) by outgoing article conveying unit 24.

Article conveyor 26 may be conventional and may be, for example, an endless belt conveyor (as is now preferred) the upper surface of which is moved in the downstream direction (as indicated by arrow 28 in FIG. 1). Article conveyor 26 could, however, be an air conveyor, a plate, such as a dead plate, along which the articles are urged, or a combination of known conveyors.

Incoming article conveying unit 21 includes a receiving end portion 33 (as illustrated in FIG. 1) having sidewalls 34 with receiving end portion 33 opening to article conveyor 26 at upstream location 29 to divert articles from article conveyor 26 (in the direction as indicated by arrow 35) such that the articles are urged along a primary intended path away from the article conveyor (preferably, but not necessarily, along a path normal to that of articles moved along conveyor 26, as shown in FIG. 1). Articles to be diverted from article conveyor 26 may be automatically diverted, for example, due to a backup on conveyor 26 such that articles on conveyor 26 are backed up to upstream location 29 to thus force additional articles being conveyed along conveyor 26 from the conveyor onto incoming article conveying unit 21 (a diverting gate, or the like, could also be provided at upstream location 29 to force, or divert, articles from conveyor 26 onto incoming article conveying unit 21).

Incoming article conveying unit 21 also includes a discharge end portion 37 having sidewalls 38 with receiving end portion 37 opening to receiving end portion 33 and conveying articles therefrom toward storage unit 9 (as indicated by arrow 39) with discharge end portion 37 terminating at side 19 of the storage unit adjacent to article loading/unloading area 13.

Outgoing article conveying unit 24 includes a receiving end portion 41 with sidewalls 42. Receiving end portion 41 is adjacent to side 23 of storage unit 9 to receive articles urged from the storage unit at article loading/unloading area 13. Articles urged from a pallet at article loading/unloading area 13 are moved away from the storage area (as indicated by arrow 43) along an intended primary path of travel that is in the same direction as the intended primary path of travel of articles moved to the storage area on discharge end portion 37 of incoming article conveying unit 21 to thus establish a thru-flow arrangement.

Outgoing article conveying unit 24 also includes a discharge end portion 45 having sidewalls 46 and opening adjacent to one end of receiving end portion 41 to receive articles conveyed therefrom and move the articles along a path (as indicated by arrow 47) toward downstream location 31 on article conveyor 26 where discharge end portion 45 opens to article conveyor 26 so that the articles are inserted onto conveyor 26 at downstream location 31 (as indicated in the drawings, discharge end portion 45 is preferably, but not necessarily, positioned such that the intended primary path of travel of articles toward article conveyor 26 is in a direction normal to the primary intended path of travel of articles along article conveyor 26, and where receiving end portion 33 of incoming article conveyor unit 21 is also normal to article conveyor 26, articles are moved to and from article conveyor in parallel but opposite directions). If needed, or desired, a gate could also be provided at downstream location 31 to assure that articles are not diverted from article conveyor 26 at the downstream location.

The receiving and discharge end portions of incoming and outgoing article conveying units 21 and 24 may be endless belt conveyors (as is now preferred) the upper surface of each of which conveys articles in the direction as indicated by the arrows in FIGS. 1 and 2, or could be air conveyors, a plate, such as a dead plate, along which articles are urged, or a combination of known conveyors.

Supporting structure 49 is utilized to support the various components of system 7, with the conveying and article loading/unloading area being preferably at a height sufficient to allow pallets 11 to be brought to and carried away from storage unit 9 (as indicated in FIG. 1).

At storage unit 9, pallets 11 are positioned to receive articles at article loading/unloading area 13 during palletizing operations with a pallet normally being placed on elevator 51 so that the first group of articles is placed on the pallet at article loading/unloading area 13 as a first layer and the pallet then being filled is indexed downwardly so that succeeding groups of articles are placed by layers one on top of the other until the pallet is filled, as is conventional. During depalletizing operations, the pallet then to be unloaded is placed so that the top layer can be removed at article loading/unloading area 13, after which the pallet is indexed upwardly as each layer is removed until the pallet is empty, as is also conventional.

Sheet transfer unit 53, having transfer arm 55 and sheet engaging means (normally vacuum cups) 57, is positioned adjacent to and above article loading/unloading area 13 to insert sheets 59 from a supply thereof one at a time on top of each layer of articles placed on a pallet at the article loading/unloading area during palletizing operations and to remove the sheet as each layer of articles is removed from the pallet during depalletizing operations.

Articles diverted from article conveyor 26 and conveyed by incoming article conveying unit 21 toward article loading/unloading area 13 are divided into groups at discharge end portion 37 of incoming article conveying unit 21 by stop unit 61. Stop unit 61 has a stop mechanism, such as extendable fingers, movable into and out of the path of articles on discharge end portion 37 to thereby control the flow of articles along discharge end portion 37 so that a group of articles is allowed to pass the stop unit each time the stop unit is moved out of the path of articles and then back into the path of the articles to block further travel of articles upstream of the stop unit along discharge end portion 37.

Each group of articles passing stop unit 61 is conveyed toward article loading/unloading area 13 and the leading (downstream) articles of the group to then be palletized come into contact with leading sweep arm 63 of sweep unit 64, and leading sweep arm 63 then leads the articles to article loading/unloading area 13. Article loading/unloading area 13 has sidewalls 65 and a movable end wall 66 (at side 23 of article loading/unloading area 13) for guiding and retaining articles on pallet 11 during palletizing operations (end wall 66 is withdrawn from the path of articles moved from pallet 11 during depalletizing operations, preferably after leading the articles from the pallet as brought out hereafter). Sweep unit 64 preferably includes three sweep arms 63, 67 and 68 (sweep arms 63, 67 and 68 are used to lead and urge articles onto the pallet during successive sweep cycles as brought out more fully hereinafter).

As best indicated in FIG. 3, sweep arms 63, 67 and 68 are mounted on endless chain 69 at spaced positions so that the sweep arms are driven about an endless loop path and each sweep arm is moved through a path just above a part of discharge end portion 37 and through article loading/unloading area 13 during each complete revolution of chain 69. Chain 69 extends about sprocket wheels 70 rotatively driven by an actuator, such as an electric motor.

During placement of a first group of articles on pallet 11, sweep arm 63, acting as a leader, or stabilizer, is moved from the home position and leads a first group of articles onto the pallet, during which time, sweep arm 67 (which initially was moving upstream above the articles) is rotated down to be behind the first group of articles and sweep arm 68 (which initially was downstream of pallet 11) is rotated up and is moving upstream above the path of articles.

Sweep arm 67 then pushes, or urges, the remainder of the articles onto the pallet, during which time, sweep arm 68 continues to move upstream above the articles and sweep arm 63 is rotated out of the path of the articles. After all articles of the first group are on the pallet, the sweep arms are reversed in direction and sweep arm 67 is moved to the home position (i.e., sweep arm 67 then assumes the position shown for sweep arm 63 as indicated in FIG. 3).

In like manner, during loading of a second group of articles onto pallet 11, sweep arm 67 is then moved from the home position to lead the articles onto the pallet and sweep arm 68 is rotated down to urge the articles onto the pallet. After all of the articles of the second group are on the pallet, the direction of movement of the sweep arms is reversed, and sweep arm 68 is moved to the home position so that sweep arm 68 can then lead the third group of articles onto pallet 11. After sweep arm 68 urges the third group of articles onto pallet 11, sweep arm 63 is used to urge the third group of articles onto the pallet, after which the direction of movement of the sweep arms is again reversed and sweep arm 63 is moved to the home position to be ready to act as the leading arm for the next group of articles to be loaded onto the pallet.

Thus, each time the articles are moved by groups during palletizing operations, one of the three sweep arms leads the articles while another of the three sweep arms later pushes the articles, with one sweep arm thus being idle during one cycle of each three cycle set.

When articles stored at storage unit 9 are later needed, articles are removed by layers from a pallet at the storage unit by urging the articles by groups from the pallet to receiving end portion 45 of outgoing article conveying unit 24 through use of palletizing/depalletizing unit 17.

Sweep unit 64 is used during depalletizing operations with sweep arms 63, 67 and 68 moving in the same direction (with respect to the direction of travel of the sweep arms during palletizing operations) to urge articles from article loading/unloading area 13. Sweep arms 63, 67 and 68 successively engage the trailing, or upstream, portion of the articles to be moved from the pallet during depalletizing operations to urge each group of articles to be moved in a direction such that the leading, or downstream, portion of the group is first moved off of the pallet toward receiving end portion 41 of outgoing article conveying unit 24.

Sweep arms 63, 67 and 68 are mounted on endless chain 69 so that the sweep arms travel about a closed loop endless path, and the sweep arms are spaced from one another so that the sweep arms are successively brought into engagement with the trailing portion of successive groups of articles to be moved from the pallet during depalletizing operations.

Chain 69 is preferably of sufficient length such that sweep arms 63, 67 and 68 are spaced along the chain so that, during depalletizing operations, the sweep arms are successively brought to a home position as the chain is rotated one-third of the distance around the closed loop path of the sweep arms.

Retainer assembly, or unit, 71 is utilized to lead each group of articles moved from the pallet to receiving end portion 41 of outgoing article conveyor unit 24. As best illustrated in FIG. 2, retainer unit 71 includes a carriage unit 73 movable back and forth in opposite directions above the path of travel of articles moved from the pallet with such movement being parallel to the direction of intended primary movement of each group of articles in being moved off of the pallet.

Carriage drive assembly 75 causes movement of the carriage unit back and forth. Carriage drive assembly 75 includes a chain 77 mounted on sprocket wheels 78 so that the chain follows a closed loop endless path. A connector arm 79 is used to connect carriage unit 73 to chain 77, to impart movement to the carriage unit when the chain is driven about the sprocket wheels, with the sprocket wheels being driven through a chain drive and clutching arrangement so that chains 69 and 77 are commonly driven to achieve precise timing between the sweep and retaining units (which units are driven at a greater speed than the conveyors forming incoming and outgoing conveying units 21 and 24).

Retainer unit 71 is normally in the home position between cycles of operation during depalletizing operations. In this position, when chain 77 is moved from the home position, carriage unit 73 is moved toward storage unit 9 until the chain has moved a sufficient distance to thereafter move carriage unit 73 in the opposite direction by continued movement of the chain about the sprockets.

Chain 77 is rotated three times about its closed loop path each time that chain 69 moves once around its closed loop path during depalletizing operations. This is preferably achieved by chain 77 being one-third as long as chain 69 and driving the chains at the same speed about like sprockets.

Retainer, or lead, arm 81 is mounted on carriage unit 73 by a retainer support arm so that retainer arm 81, as best indicated in FIG. 3, may be, and preferably is, removable end wall 66, as best indicated in FIG. 2, for use during palletizing operations, and is moved back and forth in a straight line path along with movement of carriage unit 73 so that retainer arm 81 is adjacent to and spaced from the leading portion of the group of articles to be then removed from the pallet during de-palletizing operations (the spacing between retaining arm 81 and the leading portion of the group of articles then to be removed from the pallet is preferably a distance equal to that of the initial spacing between sweep arm 63 and the trailing portion of the group of articles then to be removed from the pallet).

Thus, when retaining unit 71 is moved from the home position during depalletizing operations, the initial movement of retaining arm 81 is in a direction opposite to the intended direction of movement of articles from the pallet. This allows the retaining arm to be brought into engagement with the leading portion of the group of articles to then be removed from the pallet as a sweep arm is brought into engagement with the trailing portion of the group of articles, after which the sweep arm and retaining arm are moved in unison so that as the sweep arm urges the engaged group of articles from the pallet the retaining arm leads the engaged group from the pallet.

Retaining arm 81 is preferably pivoted on carriage 73 using cams 82 and cam followers 83 to effect pivoting to cause retaining arm 81 to be pivoted downwardly so that retainer arm 81 is engagable with the leading portion of the group of articles then to be removed from the pallet, and to cause retaining arm 81 to be pivoted upwardly so that the retaining arm is in an article non-engagable position out of the path of travel of the group of articles being urged from the pallet during depalletizing operations.

In operation, control unit 84, preferably including a computer, may be used to control the mode of operation (i.e., palletizing operations or depalletizing operations), as well as controlling associated units to effect the desired end, including establishing needed timing and sequencing.

Summarizing operations, when the system is in the palletizing mode (i.e., during palletizing operations), articles diverted from article conveyor 26 at upstream location 29 are moved along incoming article conveying unit 21 to side 19 of storage unit 9 where the articles are urged and led by groups onto a pallet thereat using palletizing/depalletizing unit 17, with each group of articles forming successive layers on the pallet until the pallet is filled (additional pallets can be utilized, as needed, to handle all diverted articles).

When in the depalletizing mode (i.e., during depalletizing operations), articles are removed from the pallet by palletizing/depalletizing unit 17 leading and urging each group of articles onto outgoing article conveying unit 24, and outgoing article conveying unit 24 then moves the articles to article conveyor 26 where the articles are inserted onto conveyor 26 at downstream location 31.

Utilizing the system and method of this invention, increased speed of operation (of up to six layers a minute, for example, as opposed to four layers per minute using at least some now known palletizing/depalletizing units) is realizable while minimizing product damage (the articles are not exposed to opposite direction movements on the same path), and reducing the required minimum time for changes in the mode of operation (articles are not required to move from one side of the system to the other before a change in mode can be effected).

As can be appreciated from the foregoing, this invention provides an improved article diverting and storage system and method utilizing a thru-flow palletizer/depalletizer.

What is claimed is:

1. A can diverting and storage system for use in conjunction with a can conveyor whereon cans are moved along a predetermined continuous path having a first location and a second location spaced along said predetermined continuous path from said first location, said system comprising:

first conveying means for receiving cans diverted from said continuous path of said can conveyor at said first location;

can storage means capable of receiving a pallet and storing cans on said pallet;

palletizing/depalletizing means for urging cans from said first conveying means onto a pallet at said can storage means during palletizing operations and for urging cans from said pallet at said can storage means during depalletizing operations; and second conveying means for receiving cans urged from said pallet at said can storage means by said palletizing/depalletizing means during depalletizing operations, said second conveying means supplying cans to said continuous path of said can conveyor at said second location.

2. The system of claim 1 wherein said first conveying means includes a receiving end portion open to said can conveyor at said first location and a discharge end portion open to said can storage means, and wherein said second conveying means includes a receiving end portion open to said can storage means at a location spaced from said discharge end portion of said first conveying means and a discharge end portion open to said can conveyor at said second location.

3. The system of claim 2 wherein said can storage means has first and second sides, wherein said discharge end portion of said first conveying means opens to said first side of said can storage means, and wherein said receiving end portion of said second conveying means opens to said second side of said can storage means.

4. The system of claim 3 wherein said first and second sides of said can storage means are at opposite sides of said can storage means, and wherein said cans urged to said can storage means from said first conveying means follow a path primarily in substantially the same direction as cans urged from said can storage means onto said second conveying means to thus establish a flow-thru system.

5. The system of claim 2 wherein the intended primary path of cans moved along said receiving end portion of said first conveying means is substantially parallel to but in the opposite direction with respect to the intended primary path of cans moved along said discharge end portion of said second conveying means.

6. An article diverting and storage system for use in conjunction with an article conveyor whereon articles are moved along a predetermined continuous path having a first location and a second location spaced along said predetermined continuous path from said first location, said system comprising:
   first conveying means for receiving articles diverted from said continuous path of said article conveyor at said first location;
   article storage means capable of receiving a pallet and storing articles on said pallet;
   palletizing/depalletizing means for urging articles from said first conveying means onto a pallet at said article storage means during palletizing operations and for urging articles from said pallet at said article storage means during depalletizing operations, said palletizing/depalletizing means including gate means for passing articles by groups and sweep means for urging and leading articles from said first conveying means onto a pallet at said article storage means by groups during palletizing operations, and said palletizing/depalletizing means also including retaining means with said sweep means urging and said retaining means leading articles from a pallet by groups during depalletizing operations; and
   second conveying means for receiving said groups of articles urged from said pallet at said article storage means by said sweep means of said palletizing/depalletizing means during depalletizing operations, said second conveying means supplying articles to said continuous path of said article conveyor at said second location.

7. An article diverting and storage system for use in conjunction with an article conveyor whereon articles are moved along a predetermined path having a first location and a second location spaced along said predetermined path from said first location, said system comprising:
   first conveying means for receiving articles diverted from said article conveyor at said first location;
   article storage means capable of receiving a pallet and storing articles on said pallet;
   palletizing/depalletizing means for urging articles from said first conveying means onto a pallet at said article storage means during palletizing operations and for urging articles from said pallet at said article storage means during depalletizing operations, said palletizing/depalletizinq means including gate means for passing articles by groups and sweep means for urging and leading articles from said first conveying means onto a pallet at said article storage means by groups during palletizing operations, wherein said palletizing/depalletizing means also includes retaining means with said sweep means urging and said retaining means leading articles from a pallet by groups during depalletizing operations, wherein said sweep means includes first, second and third sweep arms for successively urging said groups of articles onto and from said pallet, one of said sweep arms other than the sweep arm then being utilized to urge a group of said articles onto said pallet during palletizing operations being utilized to lead said articles onto said pallet, wherein said sweep means also includes first drive means for causing said sweep arms to be moved about an endless loop path in one direction to thereby cause said sweep means to successively urge and lead articles onto said pallet during palletizing operations and to be moved about said endless path in said one direction to thereby successively urge articles from said pallet during depalletizing operations, wherein said retaining means includes a retaining arm, and wherein said retaining means also includes second drive means for causing said retaining arm to be moved back and forth along a path substantially parallel to the intended primary path of articles urged from said pallet during depalletizing operations; and
   second conveying means for receiving said groups of articles urged from said pallet at said article storage means by said sweep means of said palletizing/depalletizing means during depalletizing operations, said second conveying means supplying articles to said article conveyor at said second location.

8. The system of claim 7 wherein said retaining means includes carriage means movable in reciprocal directions and having said retaining means mounted thereon, and wherein said second drive means includes an endless loop path driver for driving said carriage in said reciprocal directions.

9. An article diverting and storage system for use in conjunction with an article conveyor whereon articles are moved along a predetermined continuous path having a first location and a second location spaced along said predetermined continuous path from said first location, said system comprising:
   first conveying means for receiving articles diverted from said continuous path of said article conveyor at said first location;
   article storage means capable of receiving a pallet and storing articles on said pallet, said article storage means including sheet transfer means;
   palletizing/depalletizing means for urging articles from said first conveying means onto a pallet by groups at said article storage means during palletizing operations and for urging articles by groups from said pallet at said article storage means during depalletizing operations, said sheet transfer means of said article storage means placing a sheet over each group of articles urged onto a pallet by said palletizing/depalletizing means and removing the sheet over each group of articles after the preceding group has been urged from a pallet by said palletizing/depalletizing means; and second conveying means for receiving said groups of articles urged from said pallet at said article storage means by said palletizing/depalletizing means during depalletizing operations, said second conveying means supplying articles to said continuous path of said article conveyor at said second location.

10. The system of claim 1 wherein said system includes control means for controlling operation of said system.

11. A method for diverting and storing cans in conjunction with conveying of cans along a predetermined continuous path that includes a first location and a second location spaced along said predetermined continuous path from said first location, said method comprising:

diverting cans from said predetermined continuous path at said first location;

moving said diverted cans to a pallet at a storage area and placing said cans on said pallet;

removing cans stored on said pallet and moving said removed cans toward said second location of said predetermined continuous path; and inserting said removed cans into said predetermined continuous path at said second location.

12. The method of claim 11 wherein said method includes moving cans to and from a pallet at said storage area along predetermined different paths to thereby establish a thru-flow diverting and storage arrangement.

13. The method of claim 12 wherein said method includes moving cans to and from a pallet at said storage area along predetermined different paths with said cans being moved to the pallet at one side of said storage area and conveyed from the pallet at the opposite side of said storage area whereby the cans being moved to said storage area and moved from said storage area are moved in substantially the same direction.

14. The method of claim 12 wherein said method includes moving cans from said first location in a direction substantially opposite to that of movement of cans to said second location.

15. A palletizing/depalletizing device for moving articles by groups onto a pallet during palletizing operations and from a pallet during depalletizing operations with each group of articles having a leading portion and a trailing portion, said device comprising:

sweep means having movable article urging means engagable with the trailing portion of each group of articles to be moved relative to said pallet, said article urging means including at least first and second sweep arms, said sweep means also including drive means connected with said sweep arms so that said sweep arms are driven in a closed loop path and spaced with respect to one another along said closed loop path to alternately be brought to a home position and later moved therefrom to successively engage said trailing portion of each group of articles successively positioned at a pallet sweep area and thereafter being further moved to urge said engaged group of articles onto said pallet during said palletizing operations and from said pallet during said depalletizing operations;

retainer means having movable article retaining means engagable with the leading portion of each group of articles to be moved relative to said pallet; and actuating means connected with said sweep means and said retainer means for causing movement of said article urging means whereby said article urging means engages said trailing portion of each said group of articles and thereafter urges each said group of articles onto said pallet during said palletizing operations and from said pallet during said depalletizing operations, said actuating means also causing movement of said article retaining means whereby said article retaining means engages said leading portion of said group of articles at said pallet to preclude movement of articles from said pallet during said palletizing operations [,] and to lead each said group of articles from said pallet as said group of articles is moved from said pallet by said article urging means during said depalletizing operations.

16. The device of claim 15 wherein said article urging means of said sweep means includes first, second and third sweep arms.

retainer means having movable article retaining means engagable with the leading portion of each group of articles to be moved relative to said pallet; and actuating means connected with said sweep means and said retainer means for causing movement of said article urging means whereby said article urging means engages said trailing portion of each said group of articles and thereafter urges each said group of articles onto said pallet during said palletizing operations and from said pallet during said depalletizing operations, said actuating means also causing movement of said article retaining means whereby said article retaining means engages said leading portion of said group of articles at said pallet to preclude movement of articles from said pallet during said palletizing operations and to lead each said group of articles from said pallet as said group of articles is moved from said pallet by said article urging means during said depalletizing operations.

17. A palletizing/depalletizing device for moving articles by groups onto a pallet during palletizing operations and from a pallet during depalletizing operations with each group of articles having a leading portion and a trailing portion, said device comprising:

sweep means having movable article urging means engagable with the trailing portion of each group of articles to be moved relative to said pallet;

retainer means having movable article retaining means including a retainer arm, said retainer means including movable carriage means having said retainer arm mounted thereon, said retainer means including drive means having connector means mounted thereon with said connector means being driven in a single direction about a closed loop path during said depalletizing operations, and said retainer means including connecting means extending between said connector means and said carriage means whereby said carriage means is driven in opposite directions by said drive means when said connector means is driven through said closed loop path so that said retainer arm is movable in opposite directions substantially parallel to the direction of movement of said group of articles when urged from said pallet by said article urging means during said depalletizing operations, said retainer arm being engagable with the leading portion of each group of articles to be moved relative to said pallet with said retainer arm being positioned at said pallet during palletizing operations to preclude article movement from said pallet and positioned at a home position adjacent to said pallet during depalletizing operations to thereby be adjacent to said leading portion of each said group of articles then to be moved relative to said pallet with said retainer arm being moved in a first direction from the home position into engagement with said leading portion of said group of articles then to be moved relative to said pallet and thereafter being moved in a second direction opposite to said first direction to lead said then engaged group of articles from said pallet; and actuating means connected with said sweep means for causing movement of said article urging means whereby said article urging means engages said trailing portion of each said group of articles and thereafter urges each said group of articles onto said pallet during palletizing operations and from said pallet during depalletizing operations, said actuating means also being connected with said retainer means for causing movement of said retainer arm of said article retaining means whereby said retainer arm is caused to be positioned at said pallet to engage said leading portion of said group of articles at said pallet and thereby preclude movement of articles from said pallet during said palletizing operations, is caused to be positioned adjacent to said leading portion of each said group of articles when in the home position, and is caused to be moved in said first direction from the home position into engagement with said leading portion of said group of articles and thereafter moved in said second direction opposite to said first direction to lead said engaged group of articles from said pallet as said group of articles is urged from said pallet by said article urging means.

18. A palletizing/depalletizing device for moving articles by groups onto a pallet during palletizing operations and from a pallet during depalletizing operations with each group of articles having a leading portion and a trailing portion, said device comprising:

sweep means having movable article urging means including a plurality of sweep arms successively engagable with the trailing portions of successive groups of articles to be moved relative to said pallet, said sweep means including drive means for establishing movement of said sweep arms about a closed loop path;

retainer means having movable article retaining means engagable with the leading portion of each group of articles to be moved relative to said pallet, said retainer means also including drive means having connector means mounted thereon for establishing movement of said connector means about a closed loop path with said closed loop path established for said sweep arms providing a travel distance equal to that of said closed loop path established for said connector means multiplied by the number of sweep arms of said sweep means; and actuating means connected with said drive means of said sweep means for causing movement of said sweep arms about said closed loop path whereby said sweep arms successively engage the trailing portions of successive groups of articles to be moved relative to said pallet and thereafter urge said groups of articles onto said pallet during palletizing operations and from said pallet during depalletizing operations, said actuating means also being connected with said retainer means for causing movement of said connector means about said closed loop path whereby said article retaining means engages said leading portion of said group of articles at said pallet to preclude movement of articles from said pallet during said palletizing operations and to lead each said group of articles from said pallet as said group of articles is moved from said pallet during said depalletizing operations.

19. The device of claim 15 wherein said device includes sheet transfer means for placing a sheet over each group of articles urged onto said pallet during palletizing operations and for removing each sheet after removal of a group of articles from said pallet during depalletizing operations.

20. The device of claim 15 wherein said device includes first conveying means for receiving articles diverted from a main conveyor line and conveying said diverted articles toward said pallet, and second conveying means for receiving articles from said pallet and conveying articles from said pallet to said main conveyor line.

* * * * *